006
United States Patent Office 2,942,260
Patented June 21, 1960

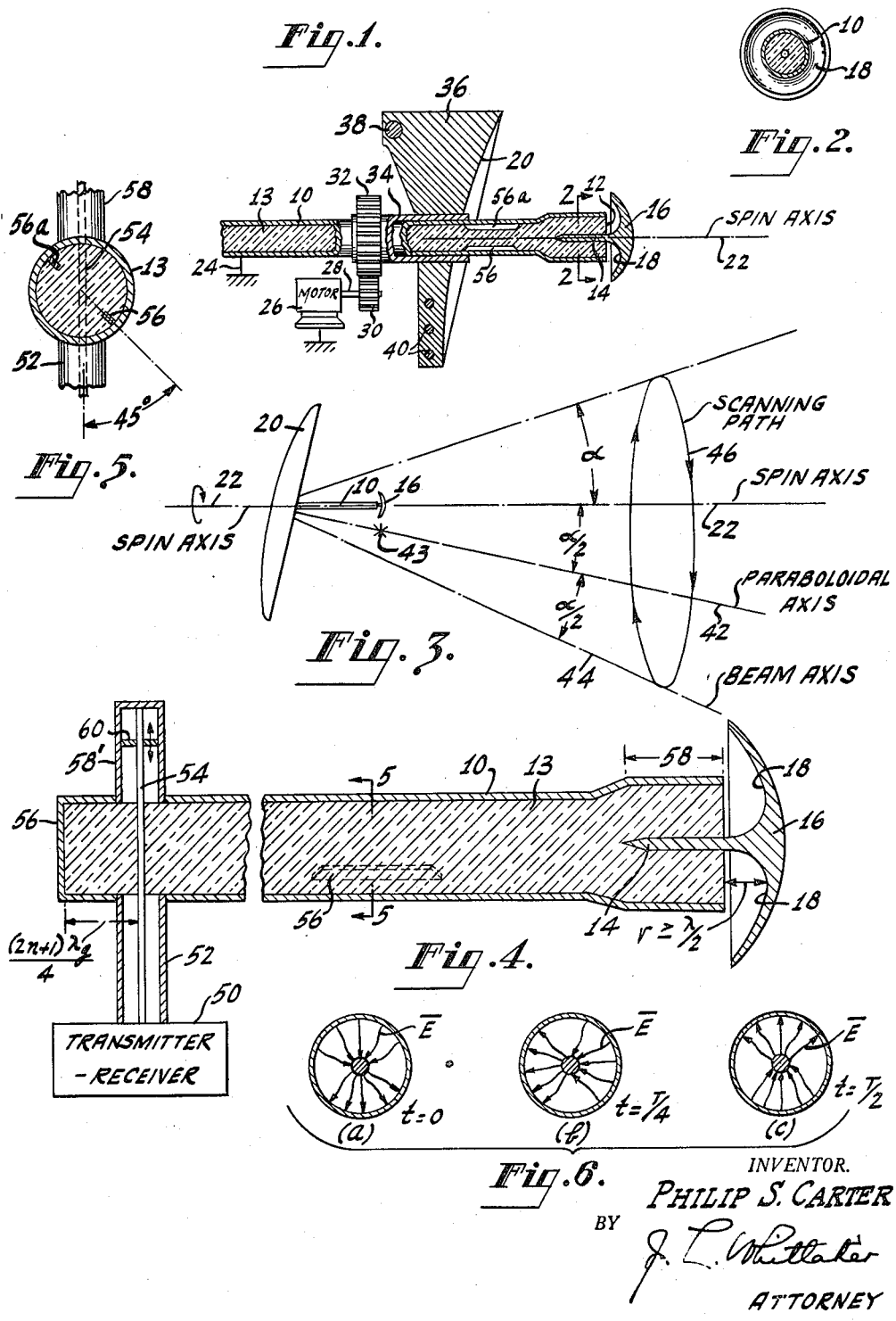

2,942,260

CIRCULARLY POLARIZED WAVE APPARATUS

Philip S. Carter, Port Jefferson, N.Y., assignor, by mesne assignments, to the United States of America as represented by the Secretary of the Air Force Filed July 1, 1955, Ser. No. 521,976

1 Claim. (Cl. 343—756)

The present invention relates, in general, to high frequency apparatus and, in particular, to an improved antenna system for transmitting circularly-polarized waves and/or receiving circularly- or plane-polarized waves.

In a system in which waves are transmitted to a distant object and received after reflection therefrom, the characteristics of the return wave (echo) depend upon the characteristics of the transmitted wave and the shape, orientation and distance of the object. Assume, for example, that the object is rod shaped and that it moves slowly through space, going through all conceivable orientations. If a vertically polarized wave is transmitted to the object and the object happens to lie horizontally, little or no signal will be reflected back toward the transmitter. If, however, the transmitted wave is horizontally polarized, a maximum amount of signal should be reflected. If the distant object is a dipole and the wave transmitted to the object is circularly-polarized, the reflected wave will be plane-polarized and its electric vector will correspond in orientation to the orientation of the dipole. If the distant object is a large, flat conducting sheet orientated normal to the direction of propagation and the transmitted wave is right-hand circularly-polarized, the reflected wave will be left-hand circularly-polarized, looking in the direction of wave travel in both cases. In other words, the rotation of the electric field at the ground station will be right-hand for both the transmitted and received waves.

It is a general object of the present invention to provide an improved arrangement for (a) translating plane-polarized waves present in a confined transmission medium to radiated, circularly-polarized waves; (b) translating incoming, circularly-polarized waves to plane-polarized waves; and (c) producing substantially equal responses in a receiver coupled to the transmission medium to any incoming plane-polarized wave regardless of the plane of polarization.

It is another object of the present invention to provide an improved wave transmission and/or receiving system especially adapted for use in the microwave region of the radio frequency spectrum.

It is yet another object of the present invention to provide an improved, conically scannable antenna system for radiating circularly polarized waves and receiving both circularly and plane-polarized waves.

It is yet another object of the present invention to provide an improved arrangement for exciting a circularly-polarized wave in a coaxial line.

According to the invention, a hollow-pipe waveguide such as a circular waveguide is provided with means for introducing therein or extracting therefrom plane-polarized, radio frequency waves. The waveguide is open at one end and a rod-shaped inner conductor member extends into said one end. A wave launching or receiving means is coupled to the open end of the waveguide. In one form of the invention, this comprises a member formed with a preferably annular reflecting surface which faces and is spaced from the open end of the waveguide. The center region of said surface is coupled to the rod-shaped member. Located in the waveguide between the open end thereof and the means for exciting the propagation of plane-polarized wave energy in the waveguide or extracting wave energy from the waveguide is a circular-polarizing means.

In operation, considering the system as a transmitting system, a plane-polarized wave in the $TE_{11}$ mode is excited in the hollow wave-guide. The circular-polarizing means converts this wave to a circularly-polarized wave in the hollow waveguide $TE_{11}$ mode. The portion of the waveguide including the rod-shaped inner conductor converts the circularly-polarized wave to a wave in the $TE_{11}$ coaxial waveguide mode. The wave is then emitted from the open end of the waveguide and reflected by the reflecting surface spaced from said open end.

Considering the system as a receiving system, when the incoming wave is circularly-polarized, the above-described mode of operation is reversed. The system is also operative when the incoming wave is plane-polarized, regardless of the direction of plane-polarization. For example, if the circular-polarizing means comprises a pair of ridges mounted to opposite inner walls of the waveguide and lying in a given plane and the incoming plane-polarized wave is at 45° to said given plane, the circular-polarizing means converts the incoming wave to a circularly polarized wave. In such case, a portion of the circularly-polarized wave is picked up by the means, such as a probe extending into the waveguide and lying in a plane at 45° to the given plane, leading to the system receiver. If the received wave is plane-polarized, parallel to or at an angle of 90° with the given plane, the circular-polarizing means does not affect the wave. However, in such case the wave is so oriented that it induces a voltage in the probe. It can easily be shown that the same voltage is induced in the probe leading to the receiver regardless of the angle of polarization of the incoming wave.

The present invention is especially useful in connection with microwave conical scanning systems. In such systems, the combination of the waveguide and other components as discussed above forms the main feed means for a main reflecting member such as the paraboloidal dish. In one form of the invention the feed means is maintained stationary with the reflecting surface of the feed means offset from the focus of the dish. The dish is then rotated in such manner that the dish axis rotates in a conical path about the feed means axis, whereby the principle antenna radiation lobe describes a cone.

The invention will be described in greater detail by reference to the following description taken in connection with the accompanying drawing in which:

Fig. 1 is a cross-sectional, partially schematic view of a typical embodiment of the present invention;

Fig. 2 is a cross-sectional view along section line 2—2 of Fig. 1;

Fig. 3 is a sketch of the antenna shown in Fig. 1 illustrating the antenna scanning pattern;

Fig. 4 is an enlarged, cross-sectional view of the feed system of the antenna shown in Fig. 1;

Fig. 5 is a cross-sectional view along section line 5—5 of Fig. 4; and,

Figs. 6a–c are a series of sketches showing the electric field configuration at the end portion of the feed system.

Throughout the figures similar reference numerals refer to similar elements.

Referring now to the drawing and particularly to Figs. 1 and 2, the feed system of the antenna includes a length of circular waveguide 10 formed with an open end 12. The rod is filled with dielectric material 13 such as polystyrene or the like. Extending into the open end is a rod-shaped inner conductor member 14. Spaced from and facing the open end of the waveguide is a member 16 formed with a conductive, annular reflecting surface 18 the center portion of which is integral with or connected to inner conductor member 14. The main antenna reflector consists of a paraboloidal dish 20 having an axis of symmetry making an acute angle $\alpha/2$ (see Fig. 3) with the longitudinal axis 22 of the circular waveguide 10.

In a preferred form of the invention, the feed system for the antenna is maintained stationary as indicated by symbol 24 and the reflector 20 is rotated about the feed axis. The drive means for the reflector includes motor 26, output shaft 28, driving gear 30 and driven gear 32. The driven gear is fixedly secured to bearing 34 and the latter is rotatable about the circular waveguide. Although not shown, means such as ball-bearings may be provided for facilitating the rotation of bearing sleeve 34 about the circular waveguide.

Antenna reflector 20 is fixedly secured to the bearing sleeve 34 and rotates therewith about the antenna axis 22. The peculiar shape of the body portion 36 of the reflector is required in order properly to mechanically balance the same. Weights 38 and 40 are utilized for the same purpose. The moment of inertia of motor 26 together with its shaft 28 and driving gear 30 is made equal to the moment of inertia of the paraboloidal dish and the elements secured thereto in order to reduce gyroscopic action to a minimum.

The conical scanning pattern provided by the antenna system of Fig. 1 is illustrated in Fig. 3. Dish 20 rotates about spin axis 22. The longitudinal axis of circular waveguide 10 is aligned with the spin axis and the waveguide remains stationary. The focal axis 42 of the paraboloidal dish is displaced from the spin axis an angle $\alpha/2$ and feed reflector member 16 is thereby slightly displaced from the focal point indicated by asterisk 43 of the paraboloidal dish. Accordingly, the axis 44 of the radiated or received beam is displaced from the spin axis an angle $\alpha$. During the spinning motion of dish 20 the beam axis moves along a conical scanning path 46 and subtends the cone apex angle $2\alpha$.

In practical embodiments of the invention, $\alpha/2$ was made between 5° and 8°, however, other angles are possible. The dish 20 was rotated at a speed of approximately 1800 revolutions per minute but other speeds of rotation may be employed.

Figs. 4 and 5 show in greater detail the antenna feed system. For purposes of the explanation which follows, the system will be assumed to act as a transmitting system. However, it will be appreciated that the invention is equally operative as a receiving system. The input to the system includes a microwave transmitter 50 coupled to a coaxial line 52. The center conductor 54 of the coaxial line extends across the entire width dimension of the circular waveguide 10 and is spaced from the end wall 56 of the waveguide a distance $$\frac{(2n+1)\lambda g}{4}$$

where $\lambda g$ is the wavelength in the waveguide of the transmitted wave and $n$ is any integer, including zero. The spacing between center conductor 54 and end wall 56 is such that a wave traveling from the conductor to the left and then reflected back from wall 56 arrives at conductor 54 in phase with the wave being transmitted to the right by conductor 54.

Center conductor 54 is terminated in an impedance matching section 58' which includes an adjustable short-circuiting means shown schematically at 60. Since the function of this device is well known it need not be discussed in further detail.

The dimensions of waveguide 10 are such that the wave excited by coaxial line 54 in the waveguide is a plane or linearly polarized wave in the $TE_{11}$ mode. The purpose of the dielectric material 13 in the wave guide is to enable the dimensions of the guide substantially to be reduced for any particular frequency. Moreover, it enables the coaxial line 52 to be pressurized if desired, said dielectric material closing off the end of said line. Finally, the dielectric material serves as a convenient mounting for rod-shaped center conductor portion 14. In one practical form of the invention, the dielectric material 13 employed was polyethylene. It has a dielectric constant of approximately 2.4. The use of this material permits a decrease in the diameter of the hollow waveguide in the ratio of $1\sqrt{2.4}$. If it is assumed that the system operating frequency is 6000 megacycles, which is equivalent to approximately 5 centimeters wave length in the air, the operating wave length in polyethylene would be 3.23 centimeters. The diameter of a hollow waveguide filled with polyethylene would be 0.577×3.23 or 1.86 centimeters at cutoff. In order to operate at a frequency reasonably above cutoff, the diameter of the hollow waveguide should be about 0.7 rather than 0.577 of the operating wave length in the material filling the waveguide. A diameter of about 2.25 centimeters is found to be a good choice for the assumed 6000 megacycle frequency. If the hollow waveguide were filled with air, on the other hand, its diameter would have to be increased to 1.55×2.25, or about 3.5 centimeters.

Conductive ridges 56, 56a which extend into the guide at an angle of 45° with center conductor 54 act as circular polarizing means. The purpose of the tapered end portions of the ridges is to smoothly match the impedance of the section of waveguide containing the ridges to the immediately adjacent sections of waveguide. The lengths of the ridges are such that the $TE_{11}$ plane polarized wave is converted to a $TE_{11}$ circularly polarized wave. In brief, this conversion is based upon the principle that the electric vector of a plane polarized wave is the sum of two wave components having electric field vectors at angles of + and −45° respectively with the plane of polarization. The ridges extending into the waveguide cause the wave component whose electric vector lies in the plane of the ridges to propagate at a slower phase velocity than the wave component normal thereto. The length of the ridges is such that the difference in guide wave lengths of the two wave components is precisely a quarter wavelength. Thus, at the far ends of the ridges the electric fields of the two wave components are in space and phase quadrature. In other words, the wave is circularly polarized.

The circularly polarized wave continues to travel to the right and reaches waveguide section 58. The latter can be thought of as a coaxial waveguide section electrically coupled to the main hollow circular waveguide 10 end-to-end. This waveguide section converts the circularly polarized $TE_{11}$ hollow waveguide mode into a circularly polarized $TE_{11}$ coaxial waveguide mode.

It will be noted that the coaxial section of waveguide 58 is of larger cross-section than hollow waveguide 10. It is joined to the hollow waveguide by a relatively short tapered section. The reason for the increase in size is to prevent increasing the cutoff frequency of the system. The cutoff frequency for the $TE_{11}$ mode in a coaxial-type waveguide depends, in a rather complicated manner, upon both the inner and outer conductor dimensions. If the inner conductor diameter is very small, the cutoff frequency is only a little higher than that for the same diameter hollow waveguide. By increasing the diameter of the outer cylinder by the correct amount, the cutoff frequency for the coaxial waveguide will be made equal to that for the hollow waveguide. The cutoff frequencies need not necessarily be the same for the two sections, but, in a preferred form of the invention, they are relatively close.

The field patterns for the circularly polarized $TE_{11}$ coaxial waveguide mode are shown in Figs. 6a–c, T being equal to the period of the wave being transmitted, and T being a unit of time. It will be noted that half of the electric field vectors point from one side of the outer conductor toward the center conductor and the remainder of the electric field vectors point from the center conductor toward the other side of the outer conductor. This mode should not be confused with the principle TEM coaxial line mode in which the electric field vectors either all point toward the outer or the inner conductor of the line. As can be seen from Fig. 6, due to the circular polarization of the input wave to section 58, the electric field vectors constantly rotate. The resultant wave radiated by reflecting surface 18 toward the paraboloidal dish 20 (Fig. 1) is circularly polarized as are the waves in the main beam pattern, that is, the waves reflected from paraboloidal dish 20.

The action of the system during reception of a wave will be explained with reference to Figs. 4 and 5. If the incoming wave is circularly polarized, ridges 56, 56a convert the wave to a plane polarized wave properly oriented to be picked up by center conductor 54. The action is the reverse of that explained above in connection with the transmission of energy. If the wave entering the coaxial line section 58 after reflection from the paraboloidal dish and surface 18 is vertically polarized (with respect to the plane of center conductor 54) it remains vertically polarized until it encounters ridges 56, 56a. These ridges convert the plane polarized wave to a circularly polarized wave and conductor 54 then picks up the vertically polarized component of the circularly polarized wave and feeds it to the receiver. A similar action takes place for an incoming horizontally polarized wave. In this last case, if it were not for the conversion from horizontal to a circular polarization, no energy would be picked up by conductor 54. If the incoming wave is polarized at an angle of 45° to the vertical, coinciding with the plane of ridges 56, 56a, there is no conversion from plane to circular polarization as the wave passes over the ridges. However, conductor 54 picks up energy from the vertical component of this wave. If the incoming wave is polarized at a plane at 45° to the vertical but at right angles to the plane of ridges 56, 56a, there is again no conversion from plane to circular polarization. However, as in the case of the other 45° wave, conductor 54 picks up the energy from the vertical component of the wave. It can readily be shown that the voltage induced in conductor 54 is of the same value for any incoming plane polarized wave, regardless of its angle of polarization.

The shape of the reflecting surface 18 is not critical. Different shapes result in different distributions of aperture illumination across the main reflector 20 (Fig. 1). Preferably the spacing between the open end of coaxial line 58 and surface 18 is at least a half-wave length or more at the operating frequency.

Although in the embodiment of the invention described in detail the feed system is maintained stationary while the main reflector is rotated thereabout to produce a conical scanning pattern, it will be appreciated that the invention is equally applicable to an antenna system wherein the main reflector is maintained stationary and the feed system rotated about the main reflector focal axis in a conical scanning pattern. Arrangements of this type are well known to those skilled in the art and need not be described in further detail.

It will also be appreciated that although in the embodiment of the invention described the waveguide element of the feed system is filled with dielectric, the invention is equally applicable to a system wherein a gas such as air is located in the feed waveguide. In arrangements of this type, metallic ridge type circular polarizing means, or dielectric circular polarizing means, or other well known circular polarizing means may be employed. The specific embodiment shown is illustrative of the invention and not meant to be limiting.

In the arrangement of Figure 4 the transmitter-receiver is schematically illustrated. In a practical system in which the conical scanning antenna is used for both transmitting and receiving, the transmitter may be connected directly to a coaxial line 52 and the receiver connected to the line through a duplexing device such as a T.-R. device. In other arrangements, two separate antennas may be employed, one for transmitting and one for receiving. In such cases the antennas may be driven in synchronism from the same mechanical or electrical driving arrangement and one of the antennas connected to the system transmitter and the other to the system receiver.

The means shown for coupling energy into the waveguide or extracting energy from the waveguide is also only a typical example of the manner in which this function may be performed. Other equivalent, well known circuits may be used instead. For example, the input means may consist of a length of rectangular waveguide coupled to a side of the circular waveguide 10 with the axis of the rectangular waveguide perpendicular to the axis of the circular waveguide and with the longer dimension of the rectangular waveguide parallel to the circular waveguide axis. Another well known coupling means which may be employed is a coaxial line having a center conductor which extends a relatively short distance into the circular waveguide forming a stub, said center conductor being perpendicular to the circular waveguide axis.

What is claimed is:

An antenna comprising, in combination, a first hollow-pipe waveguide; means spaced from one end of said first waveguide and coupled thereto for propagating plane polarized wave energy therein or extracting plane polarized wave energy therefrom; circular polarizing means located in said first waveguide between said propagating-extracting means and the other end of said first waveguide for converting plane polarized wave energy traveling from said propagating-extracting means to circularly polarized wave energy and for converting circularly polarized wave energy traveling from the other end of said waveguide toward said propagating-extracting means to plane polarized wave energy; output-input means including a second hollow-pipe waveguide having a larger diameter than said first waveguide; tapered waveguide means located at said other end of said first waveguide for coupling said first and second waveguides together end-to-end along a common axis; a rod shaped inner conductor extending into said second waveguide the entire length thereof and being aligned with said common axis whereby said conductor and said second waveguide form a coaxial line; first reflector means spaced from and facing the open end of said second waveguide and having its center electrically connected to one end of said conductor; second reflector means positioned to reflect the circularly polarized wave energy emitted from the open end of said second waveguide and reflected by said first reflector means and to transmit wave energy impinging thereon from an external source to the first reflector means, said second reflector means having a focal axis angularly disposed to and intersecting said common axis; and means for rotating one of said reflectors about said common axis.

References Cited in the file of this patent

UNITED STATES PATENTS

| | | |
|---|---|---|
| 2,425,336 | Mueller | Aug. 12, 1947 |
| 2,530,818 | Fox | Nov. 21, 1950 |
| 2,531,454 | Marshall | Nov. 28, 1950 |
| 2,611,087 | Alford | Sept. 16, 1952 |
| 2,643,338 | Brady | June 23, 1953 |
| 2,645,769 | Roberts | July 14, 1953 |
| 2,694,778 | Rowland | Nov. 16, 1954 |
| 2,702,858 | Foster | Feb. 22, 1955 |
| 2,750,588 | Hennessey | June 12, 1956 |